April 16, 1968

J. L. LEISTRA 3,377,852

DEVICE FOR TESTING YARNS

Filed June 3, 1965

INVENTOR.
JOHANNES L. LEISTRA
BY
Frank R. Trifari
AGENT

United States Patent Office 3,377,852
Patented Apr. 16, 1968

3,377,852
DEVICE FOR TESTING YARNS
Johannes Libbe Leistra, Enschede, Netherlands, assignor to North American Philips Company, Inc., New York, N.Y., a corporation of Delaware
Filed June 3, 1965, Ser. No. 460,980
Claims priority, application Netherlands, June 5, 1964, 64—6,359
6 Claims. (Cl. 73—160)

ABSTRACT OF THE DISCLOSURE

In a yarn testing device having a pair of spaced confronting metal capacitor plates through which the yarn passes, a thin layer of a poor insulator material covers at least one confronting metal surface and thereby suppresses the large transient voltage pulses that otherwise would result from the static electric charges deposited on the capacitor plates by the passing yarn.

---

Figure 1:
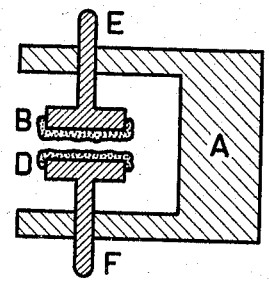

This invention relates to devices for testing yarns to determine irregularities therein or for determining or registering the yarn mass. In particular, the invention relates to a yarn testing device wherein a measuring capacitor is included in a control circuit and the yarn to be tested is passed through the plates of the capacitor so that, upon occurrence of certain irregularities, a signal is produced in a device which actuates a cutting mechanism or an indicator device, or from which an electrical signal, for example, a potential, is derived, which is a measure of the yarn mass. Devices of this kind are described for instance in the U.S. Patents 3,132,407, 3,161,835 and 2,565,500 respectively.

A difficult problem involved in such electrical measurements on moving yarns is that an electrical charge is developed on the yarns, which is produced when coils are unwound, thread guides are passed, or possibly due to the friction with air.

In the literature it is stated that coils may develop voltages up to 80 kilovolts. The forces thus acting on the thread may become so great that a cross coil can no longer be wound. The strength of the charge depends upon the composition of the thread and upon the speed.

It has been found that, when a charged yarn passes between the plates of a capacitor used in a device as above described, voltages are produced in the impedance or impedances connected to the capacitor. In the simplest case, one of the plates is connected to earth directly and the other through an impedance Z. Voltages then appear across the impedance Z which contain components having comparatively low frequencies of approximately a few kc./s. which are more or less dependent upon the speed of the yarn. Furthermore, steep pulses of short duration may occur at random. If the capacitor is included in an electrical circuit in which other voltages and currents are also active, the voltages and currents resulting from the passage of the yarn, and originating from static charges, are superimposed on the voltages and currents already available. If the circuit includes non-linear elements, they are also mixed with the available voltages and currents, or, in other words, modulated thereon.

The interfering voltages of low frequencies are not particularly troublesome since they can be separated by means of filters, or in another way, from the signals with which the measurement or, in general, the observation concerned is performed. The steep pulses of frequently short duration, of the order of micro-seconds, cause difficulties since they cannot be distinguished from the useful signals. Furthermore, these pulse voltages may be a factor of 100 times greater than the voltages which are to be measured.

It is in practice impossible to eliminate the static charges on the yarn by leading it over an earthed metallic thread-guide before reaching the measuring capacitor. The reduction is static charge thus obtainable is negligible, and practical difficulties arise in leading the yarn over many an extensive earthed thread-guides, and still the charges cannot be eliminated adequately in this way.

It has been suggested to insulate the plates of the measuring capacitor and for this purpose the plates may be covered with insulating material in the form of foil. The provision of such an insulating layer is only a temporary remedy, however. In fact, after a certain lapse of time, the insulating layer is found to be charged so high that a breakdown, either complete or partial, occurs once again due to inhomogeneities. Thus, the interfering pulses ultimately reach the external circuit again.

An object of the invention is to overcome this disadvantage in a more efficacious manner. The invention is characterized in that a thin layer of a poor insulator material covers the surface of at least one of the plates which faces the other plate.

The operation may be explained as follows:
Small electric charges are brought onto the electrodes of the measuring capacitor, or the surrounding insulating material, due to contact with projecting yarn fibers, or possibly, by very small spark discharges therebetween. The deposition of such charges causes pulses of short duration, but with a steep front, in the external electric circuitry.

On the poor insulator layer, the same thing happens in the first instance, but a charge locally occurring may spread over a larger surface area and in a larger volume and ultimately slowly leak off the ground. Instead of a few breakdowns per minute, as occurs otherwise, there is a more or less continuous dissipation of charge to earth which is no longer interfering.

The specific resistance of the insulation layer may readily be determined by experiment. If the specific resistance is unduly high, the said effect does not occur since the substance then behaves as an insulator. If the specific resistance is unduly low, the device does not operate either since the layer may then be regarded as an extension of the capacitor plate. Satisfactory results may be obtained with a layer which is from several microns to several tens of microns thick, preferably between one to a hundred microns thick, and has a specific resistance of $10^8$ to $10^{12}$ ohm-cm.

The poor insulating material may be, for example, a mixture of finely-divided carbon and a hardening synthetic resin, which can be applied to the plates of the capacitor like a paint, the layer being hardened after a thermal treatment. Also. a poorly conducting substance, such as germanium, may be applied by evaporation. The layer may also have the form of a thin film of a poor insulating material, for instance a plastic, which is applied to the plates of the capacitor by gluing. Special advantages, for instance, improved homogeneity of the field between the plates, are obtained if the substance chosen as the poor insulating material also has a very high dielectric constant. For this purpose, a titanate, e.g. barium titanate, may be used, containing sufficient impurities such that it becomes poor insulating and exhibits any specific resistance below $10^{14}$ ohm-cm. A method of manufacturing such materials is described, for instance, in the British patent specification 714,965.

Figure 2:
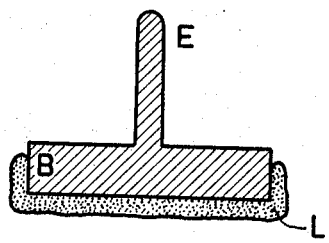
Figure 3:
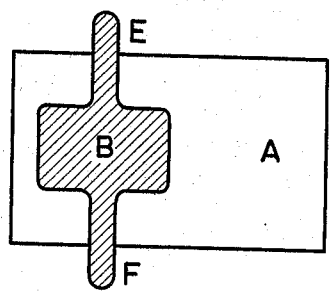
Figure 4:
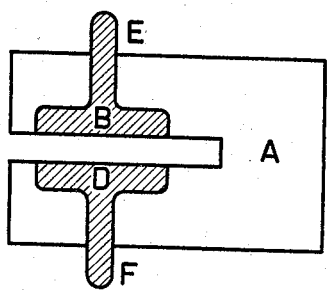
Figure 5:
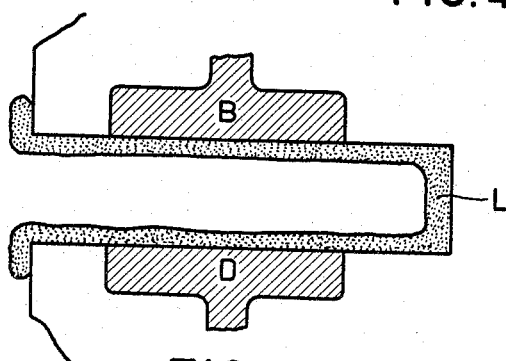

The invention is illustrated by way of example in the accompanying drawing, wherein:
FIG. 1 shows an embodiment of the invention.
FIG. 2 shows an extended part of FIG. 1.
FIGS. 3, 4 and 5 show successive steps for manufacturing a further embodiment of the invention.

In FIGURE 1, there is shown a block of insulating material A in which two metal parts B and D are fastened with their supporting rods E and F.

The surfaces of B and D form the capacitor. Electrical connection is made to the protruding ends of E and F.

In FIGURE 2, one of the metal parts is shown having a thin layer L of a poor insulating material which covers at least that part of the surface of plate B which is adjacent to the opposite electrode D in FIGURE 1.

In FIGURE 3 is shown the first step of an alternative method of constructing the measuring capacitor. A is a block of insulating material in which is embedded a metal part B having connecting wires or pins E and F.

FIGURE 4 shows the same block A after the second step of manufacture. A slot is cut or milled in it, dividing the metal part B of FIGURE 3 into two separate parts B and D, each having its own connecting wire or pin E and F, respectively. After this operation, the conductors B plus E and D plus F form the measuring capacitor.

FIGURE 5 shows the slot in the block of insulating material. The internal faces of this slot carry the capacitor-electrodes B and D. The thin layer L of poor insulating material is now applied to at least the surfaces of the capacitor-electrodes, but preferably to the whole of the inner surface of the slot so that the effect of slowly dissipating electrical charges, wherever they may appear, as described in the text, is effectively obtained.

What is claimed is:

1. An air capacitor for use in a device for testing yarn to detect irregularities in the yarn mass, said device including means for passing the yarn to be tested through the plates of said capacitor so that, upon occurrence of certain irregularities, a signal is produced in the device which actuates a cutting mechanism or an indicator device, said capacitor comprising a pair of spaced confronting metal plates and a thin layer of poor insulator material covering the confronting surface of at least one of the plates.

2. Apparatus according to claim 1 further comprising a body of insulating material having a slot therein, and wherein the plates form a part of the internal surface of said slot, the internal surface of the slot being covered with a thin layer of a poor insulating material.

3. Apparatus according to claim 1, wherein the layer has a thickness between 1 and 100 microns and a specific resistance between $10^8$ and $10^{12}$ ohm-cm.

4. Apparatus according to claim 1, characterized in that the layer of poor insulator material covers only the surfaces of the capacitor plates facing each other and consist of an impure titanate having a specific resistance between $10^8$ and $10^{12}$ ohm-cm. and a dielectric constant which is large compared to 1.

5. In a yarn testing device including means for passing the yarn between the plates of a capacitor and electric circuit means for indicating a given variation in the dimensions of the yarn, the improvement comprising a capacitor having a pair of spaced confronting metal plates between which the yarn passes and deposits a static electric charge thereon, a thin layer of a poor insulator material uniformly covering the entire confronting face of one of said metal plates and having a resistivity in the range of $10^8$ to $10^{12}$ ohm-cm., and means for connecting said metal plates to said electric circuit means.

6. A device as described in claim 5 wherein said layer of insulator material comprises a titanate containing sufficient impurities so that it exhibits a resistivity in the range of $10^8$ to $10^{12}$ ohm-cm. and a relatively large dielectric constant.

References Cited
UNITED STATES PATENTS

| | | | |
|---|---|---|---|
| 2,671,199 | 3/1954 | Truitt | 73—160 X |
| 3,009,101 | 11/1961 | Locher | 324—61 |
| 3,185,924 | 5/1965 | Locher | 324—61 |
| 3,298,864 | 1/1967 | Maylandt | 317—242 X |

DAVID SCHONBERG, *Primary Examiner.*